(12) United States Patent
Okada et al.

(10) Patent No.: US 11,258,087 B2
(45) Date of Patent: Feb. 22, 2022

(54) NON-AQUEOUS FLOW BATTERY WITH LITHIUM ION CONDUCTIVE FILM

(71) Applicant: Panasonic Intellectual Property Management Co., Ltd., Osaka (JP)

(72) Inventors: Yuka Okada, Hyogo (JP); Shinji Ando, Osaka (JP); Sho Shibata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 316 days.

(21) Appl. No.: 16/655,176

(22) Filed: Oct. 16, 2019

(65) Prior Publication Data
US 2020/0052315 A1 Feb. 13, 2020

Related U.S. Application Data

(63) Continuation of application No. PCT/JP2019/016438, filed on Apr. 17, 2019.

(30) Foreign Application Priority Data

May 17, 2018 (JP) .............................. JP2018-095693

(51) Int. Cl.
H01M 8/18 (2006.01)
H01M 8/1044 (2016.01)
H01M 8/10 (2016.01)

(52) U.S. Cl.
CPC ......... *H01M 8/1044* (2013.01); *H01M 8/188* (2013.01); *H01M 2008/1095* (2013.01); *H01M 2300/0082* (2013.01)

(58) Field of Classification Search
None
See application file for complete search history.

(56) References Cited

U.S. PATENT DOCUMENTS

2003/0187081 A1   10/2003   Cui
2009/0239113 A1    9/2009   Hase et al.
(Continued)

FOREIGN PATENT DOCUMENTS

JP    2003-526716    9/2003
JP    2007-294436   11/2007
(Continued)

OTHER PUBLICATIONS

Jia et al., High-energy density nonaqueous all redox flow lithium battery enabled with a polymeric membrane, Sci. Adv. 2015;1: e1500886, pp. 1-7 (Year: 2015).*
(Continued)

Primary Examiner — Lucas J. O'Donnell
(74) Attorney, Agent, or Firm — McDermott Will and Emery LLP

(57) ABSTRACT

The present disclosure provides a flow battery comprising a flexible lithium ion conductive film having durability against a highly reductive non-aqueous electrolyte liquid. The flow battery according to the present disclosure comprises a first non-aqueous electrolyte liquid, a first electrode, a second electrode, and a lithium ion conductive film. The first non-aqueous electrolyte liquid contains lithium ions and further biphenyl, phenanthrene, stilbene, triphenylene, anthracene, acenaphthene, acenaphthylene, fluorene, fluoranthene, o-terphenyl, m-terphenyl, or p-terphenyl. The lithium ion conductive film comprises a composite body. The composite body contains a lithium ion conductive polymer and polyvinylidene fluoride. The lithium ion conductive polymer includes an aromatic ring into which a lithium salt of an acidic group has been introduced. The lithium ion conductive polymer and the polyvinylidene fluoride have been mixed with each other homogeneously in the composite body.

15 Claims, 3 Drawing Sheets

(56) References Cited

U.S. PATENT DOCUMENTS

| | | | |
|---|---|---|---|
| 2013/0224609 A1 | 8/2013 | Lee et al. | |
| 2014/0178735 A1 | 6/2014 | Wang et al. | |
| 2015/0255803 A1* | 9/2015 | Delnick | H01M 4/9041 |
| | | | 429/498 |
| 2018/0048004 A1 | 2/2018 | Hojo | |
| 2019/0058207 A1 | 2/2019 | Fujimoto | |
| 2019/0081302 A1 | 3/2019 | Ando | |
| 2019/0189987 A1* | 6/2019 | Yang | H01M 50/411 |

FOREIGN PATENT DOCUMENTS

| | | |
|---|---|---|
| JP | 2010-033890 | 2/2010 |
| JP | 2013-182887 | 9/2013 |
| JP | 2014-524124 | 9/2014 |
| JP | 2016-085955 | 5/2016 |
| JP | 2019-050192 | 3/2019 |
| WO | 2016/208123 | 12/2016 |
| WO | 2018/016247 | 1/2018 |

OTHER PUBLICATIONS

Jing Rene et al., A novel chloromethylated/quaternized poly(sulfone)/poly(vinylidene fluoride) anion exchange membrane with ultra-low vanadium permeability for all vanadium redox flow battery, Journal of Membrane Science, vol. 544, 2017, pp. 186-194, (Year: 2017).*

Chng, M. L. (2018). Membranes for redox flow batteries (Order No. 10907576). Available from ProQuest Dissertations & Theses Global. (2088465546). (Year: 2018).*

International Search Report of PCT application No. PCT/JP2019/016438 dated Jul. 16, 2019.

Chuankun Jia et. al., "High-energy density nonaqueous all redox flow lithium battery enabled with a polymeric membrane", Science Advances, vol. 1, No. 10, e1500886, Nov. 27, 2015.

* cited by examiner

NON-AQUEOUS FLOW BATTERY WITH LITHIUM ION CONDUCTIVE FILM

BACKGROUND

1. Technical Field

The present disclosure relates to a flow battery.

2. Description of the Related Art

Patent Literature 1 discloses a redox flow battery system comprising an energy reservoir containing a redox mediator. Patent Literature 2 discloses a flow battery using a redox material.

Non-patent Literature 1 discloses a flow battery in which a polymer solid electrolyte is used as a partition part.

CITATION LIST

Patent Literature

Patent Literature 1: JP 2014-524124
Patent Literature 2: WO 2016/208123

Non-Patent Literature

Non-patent Literature 1: Chuankun Jia et al. "High-energy density nonaqueous all redox flow lithium battery enabled with a polymeric membrane", Science Advances, Vol. 1, Issue 10, Nov. 26, 2015, E1500886

SUMMARY

An object of the present disclosure is to provide a flow battery comprising a flexible lithium ion conductive film having durability against a highly reductive non-aqueous electrolyte liquid.

The flow battery according to the present disclosure comprises:

a first non-aqueous electrolyte liquid;
a first electrode in contact with the first non-aqueous electrolyte liquid;
a second electrode which serves as a counter electrode of the first electrode; and
a lithium ion conductive film which separates the first electrode and the second electrode from each other,
wherein
the first non-aqueous electrolyte liquid contains:
lithium ions; and
at least one kind of first redox material selected from the group consisting of biphenyl, phenanthrene, stilbene, triphenylene, anthracene, acenaphthene, acenaphthylene, fluorene, fluoranthene, o-terphenyl, m-terphenyl, and p-terphenyl;
the lithium ion conductive film comprises a composite body;
the composite body contains a lithium ion conductive polymer and polyvinylidene fluoride;
the lithium ion conductive polymer includes an aromatic ring into which a lithium salt of an acidic group has been introduced; and
the lithium ion conductive polymer and the polyvinylidene fluoride have been mixed with each other homogeneously in the composite body.

The present disclosure provides a flow battery comprising a flexible lithium ion conductive film having durability against a highly reductive non-aqueous electrolyte liquid.

DETAILED DESCRIPTION OF THE EMBODIMENTS

Hereinafter, the embodiments of the present disclosure will be described with reference to the drawings.

First Embodiment

Figure 1:
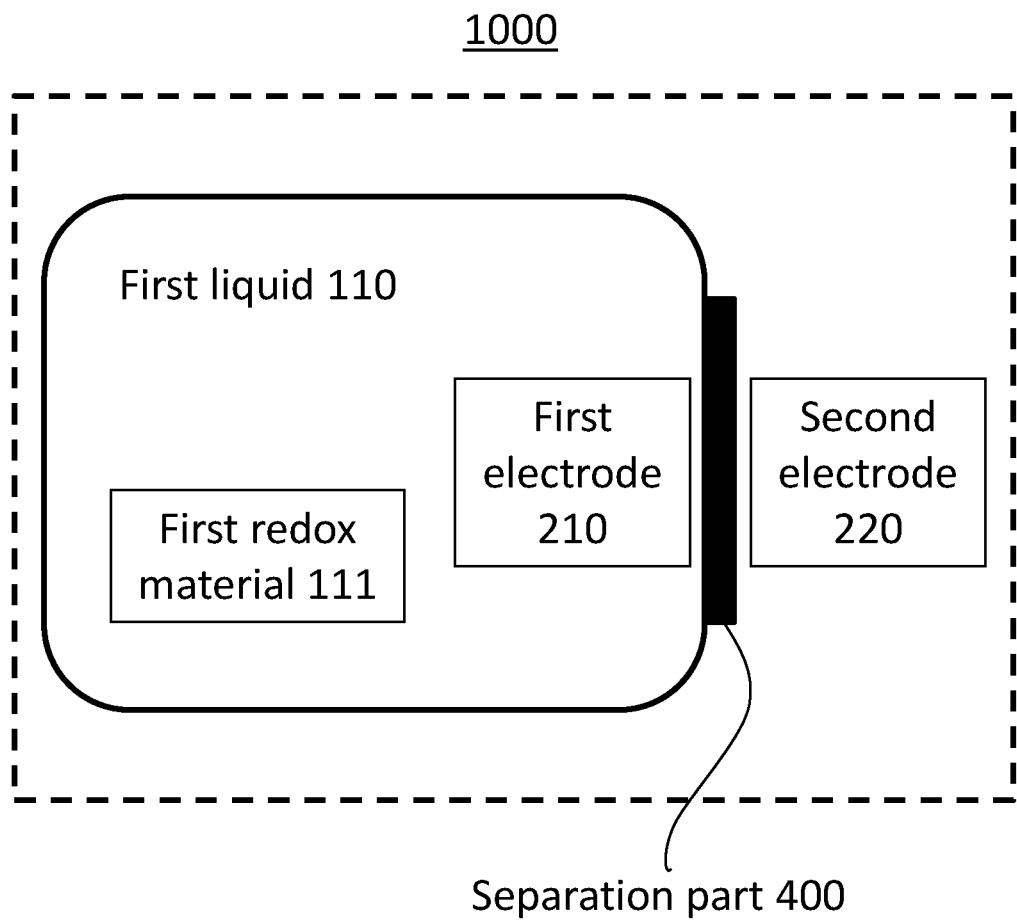
FIG. 1 shows a block diagram of a flow battery according to the first embodiment.

FIG. 1 shows a block diagram of a flow battery 1000 according to the first embodiment.

The flow battery 1000 according to the first embodiment comprises a first non-aqueous electrolyte liquid 110, a first electrode 210, a second electrode 220, and a lithium ion conductive film 400. The first electrode 210 is in contact with the first non-aqueous electrolyte liquid 110. The second electrode 220 serves as a counter electrode of the first electrode 210.

(First non-aqueous electrolyte liquid 110) The first non-aqueous electrolyte liquid 110 contains lithium ions and a first redox material. The first redox material is at least one selected from the group consisting of biphenyl, phenanthrene, stilbene, triphenylene, anthracene, acenaphthene, acenaphthylene, fluorene, fluoranthene, o-terphenyl, m-terphenyl, and p-terphenyl.

The lithium ions may be derived from at least one selected from the group consisting of $LiBF_4$, $LiPF_6$, lithium bis (trifluoro methanesulfonyl)imide (hereinafter, referred to as "LiTFSI"), lithium bis (fluorosulfonyl)imide (hereinafter, referred to as "LiFSI"), $LiCF_3SO_3$, and $LiClO_4$. In other words, the first non-aqueous electrolyte liquid 110 may contain at least one selected from the group consisting of $LiBF_4$, $LiPF_6$, LiTFSI, LiFSI, $LiCF_3SO_3$, and $LiClO_4$.

Since the first non-aqueous electrolyte liquid 110 contains the lithium ions and the first redox material, the first non-aqueous electrolyte liquid 110 is a strong reductant agent. A problem raised by that the first non-aqueous electrolyte liquid 110 is a strong reductant agent will be described later.

The first non-aqueous electrolyte liquid 110 contains a compound having at least one selected from the group consisting of a carbonate group and an ether bond as a non-aqueous solvent. The solvent may have a high dielectric constant, low reactivity with lithium ions, and an upper limit of a potential window of about not less than 4 volts (vs. $Li^+/Li$).

An example of the non-aqueous solvent having the carbonate group is propylene carbonate (hereinafter referred to as "PC"), ethylene carbonate (hereinafter referred to as "EC"), dimethyl carbonate (hereinafter referred to as "DMC"), ethyl methyl carbonate (hereinafter referred to as "EMC"), or diethyl carbonate (hereinafter referred to as "DEC").

An example of the non-aqueous solvents having the ether bond is dimethoxyethane, dibutoxyethane, diethylene glycol dimethyl ether (hereinafter referred to as "diglyme"), triethylene glycol dimethyl ether (hereinafter referred to as "triglyme"), tetraethylene glycol dimethyl ether (hereinafter referred to as "tetraglyme"), tetrahydrofuran, 2-methyltetrahydrofuran, 2,5-dimethyltetrahydrofuran, 1,3-dioxolane, or 4-methyl-1,3-dioxolane.

(Lithium Ion Conductive Film 400)

The lithium ion conductive film 400 separates the first electrode 210 and the second electrode 220 from each other.

The lithium ion conductive film 400 comprises a composite body. The composite body contains a lithium ion conductive polymer and polyvinylidene fluoride (hereinafter, referred to as "PVDF"). The lithium ion conductive polymer includes an aromatic ring into which a lithium salt of an acidic group has been introduced. In the lithium ion conductive polymer, it is desirable that the aromatic ring into which the lithium salt of the acidic group has been introduced is included in the main chain of the lithium ion conductive polymer. However, the aromatic ring may be included in the side chain of the lithium ion conductive polymer.

In the composite body, the lithium ion conductive polymer and the polyvinylidene fluoride have been mixed homogeneously with each other. The sentence "the lithium ion conductive polymer and the polyvinylidene fluoride have been mixed homogeneously with each other" means a state where the lithium ion conductive polymer and the polyvinylidene fluoride have been mixed with each other so homogeneously that a significant phase separation is not found visually. Put shortly, the phrase "mixed with each other homogeneously" means "compatible" chemically.

Desirably, the composite body has a shape of a film. In other words, the composite body is a composite film.

(Lithium Ion Conductive Polymer)

As above described, the lithium ion conductive polymer includes the aromatic ring into which the lithium salt of the acidic group has been introduced.

An example of the aromatic ring is:

(i) biphenyl represented by the chemical formula —($C_6H_4$)—($C_6H_4$)—; or (ii) diphenyl ether represented by the chemical formula —($C_6H_4$)—O—($C_6H_4$)—.

In other words, the lithium ion conductive polymer may include at least one selected from the group consisting of a biphenyl structure and a diphenyl ether structure.

If the lithium ion conductive polymer has both the biphenyl structure and the diphenyl ether structure, the aromatic ring included in the biphenyl structure and the aromatic ring included in the diphenyl ether structure may be overlapped with each other.

The lithium ion conductive polymer may have a sulfonyl group (i.e., —$SO_2$— group). Similarly to the case of the aromatic ring, it is desirable that the sulfonyl group is included in the main chain of the lithium ion conductive polymer. However, the sulfonyl group is included in the side chain of the lithium ion conductive polymer.

An example of the acidic group is:

(i) a sulfonic acid group represented by the chemical formula —$SO_3H$, (ii) a carboxylic acid group represented by the chemical formula —$CO_2H$;

(iii) a trifluoromethanesulfonylimide group represented by the chemical formula —NHS(=O)$_2$CF$_3$;

(iv) a fluorosulfonylimide group represented by the chemical formula —NHS(=O)$_2$F;

(v) a phosphonic acid group represented by the chemical formula —P(=O)(OH)$_2$;

(vi) a fluorophosphonic acid group represented by the chemical formula —P(=O)F(OH); or (vii) a phosphoric acid group represented by the chemical formula —OP(=O)(OH)$_2$.

The fluorine atom included in the trifluoromethanesulfonylimide group, the fluorosulfonylimide group, and the fluorophosphonic acid group promotes the dissociation of metal ions to improve the conductivity. The phosphonic acid group increases the number of ion exchange sites to improve the conductivity.

The number of the acidic group included in each of the aromatic ring included in the lithium ion conductive polymer may be one. Alternatively, the number of the acidic group may be two or more.

An example of the lithium ion conductive polymer including the aromatic ring into which the lithium salt of the acidic group has been introduced is represented by the following chemical formula (I).

[Chem. 1]

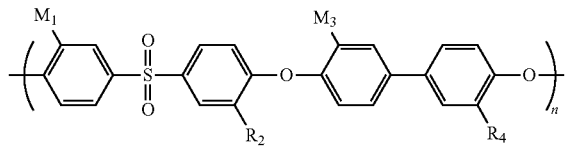

(I)

where n is a natural number;

at least one group selected from the group consisting of $R_1$, $R_2$, $R_3$, and $R_4$ is, each independently, selected from the group consisting of a —$SO_3Li$ group or a hydrogen atom; and the at least one group selected from the group consisting of $R_1$, $R_2$, $R_3$, and $R_4$ is the —$SO_3Li$ group.

It is acceptable that all of the groups $R_1$-$R_4$ are —$SO_3Li$ groups. In other words, the lithium ion conductive polymer is represented by the following chemical formula (II).

[Chem. 2]

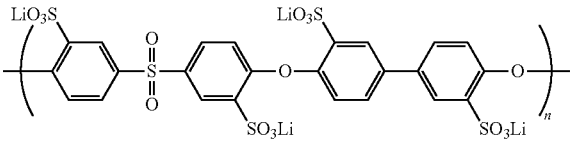

(II)

Among $R_1$-$R_4$, it is acceptable that one group is the —$SO_3Li$ group and the other three groups are hydrogen atoms. For example, $R_1$, $R_2$, $R_3$, and $R_4$ may be a —$SO_3Li$ group, a hydrogen atom, a hydrogen atom, and a hydrogen atom, respectively.

Among $R_1$-$R_4$, it is acceptable that two groups are the —$SO_3Li$ groups and the other two groups are hydrogen atoms. For example, $R_1$, $R_2$, $R_3$, and $R_4$ may be a —$SO_3Li$ group, a —$SO_3Li$ group, a hydrogen atom, and a hydrogen atom, respectively.

Among $R_1$-$R_4$, it is acceptable that three groups are the —$SO_3Li$ groups and the other one group is a hydrogen atom. For example, $R_1$, $R_2$, $R_3$, and $R_4$ may be a —$SO_3Li$ group, a —$SO_3Li$ group, a —$SO_3Li$ group, and a hydrogen atom, respectively.

However, it is not acceptable that all of the groups $R_1$-$R_4$ are hydrogen atoms.

In the chemical formula (I), the acidic group is a sulfonic acid group represented by the formula —$SO_3H$. The hydrogen atom included in the sulfonic acid is substituted with a lithium atom.

In the chemical formula (I), the lithium ion conductive polymer includes the biphenyl structure and the diphenyl ether structure. In the chemical formula (I), the lithium ion conductive polymer further includes a sulfonyl group.

As demonstrated in the comparative example 1 which will be described later, when the composite body containing the lithium ion conductive polymer represented by the chemical formula (I) is brought into contact with the first non-aqueous electrolyte liquid 110 containing lithium ions and biphenyl (which is one kind of the first redox material), the composite body is swelled. This raises a problem that the lithium ion conductive film 400 including the composite body fails to serve.

As demonstrated in the reference example 1 which will be described later, the present inventors have found that even when polyvinylidene fluoride (namely, a polymer represented by the chemical formula —$((CH_2)$—$(CF_2))_n$—) is brought into contact with the first non-aqueous electrolyte liquid 110, the polyvinylidene fluoride is not swelled (namely, not deformed).

The present inventors have made the present invention on the basis of the findings. In other words, in the present invention, the lithium ion conductive film 400 comprises the composite body containing the lithium ion conductive polymer and polyvinylidene fluoride. The composite body is not swelled (namely, not deformed) even when brought into contact with the first non-aqueous electrolyte liquid 110. Furthermore, the function of the lithium ion conductive film 400 including the composite body is maintained.

In addition, in the inside of the composite body containing the lithium ion conductive polymer and the polyvinylidene fluoride, the lithium ion conductive polymer and the polyvinylidene fluoride have been mixed homogeneously with each other. As demonstrated in the inventive example 1, the lithium ion conductive polymer and the polyvinylidene fluoride have been mixed with each other so homogeneously that a significant phase separation is not found visually.

On the other hand, as demonstrated in the comparative example 2 which will be described later, the present inventors have found that when polytetrafluoroethylene is brought into contact with the first non-aqueous electrolyte liquid 110, the color of the polytetrafluoroethylene is turned into black. The reason why the color is turned into black would be that the polytetrafluoroethylene is reduced and carbonized due to the strong reduction ability of the first non-aqueous electrolyte liquid 110.

A weight ratio of the lithium ion conductive polymer to the polyvinylidene fluoride is, for example, not less than 3/7 and not more than 8/2. The weight ratio may be not more than 5/5.

The lithium ion conductive film 400 may be formed of a polymer base material including the composite body. The polymer base material is formed of one or more kind of resin selected from the group consisting of a thermosetting resin and a thermoplastic resin which has a melting point of not less than 150 degrees Celsius. The polymer base material has an interspace which communicates with the outside thereof.

The inside of the interspace of the polymer base material is filled with the lithium ion conductive polymer. In other words, the lithium ion conductive polymer is held in the inside of the interspace. In this way, lithium ion conductivity derived from the lithium ion conductive polymer is ensured, and the mechanical strength sufficient for the use as the lithium ion conductive film included in the flow battery is provided.

Since the lithium ion conductive polymer is acidic, the polymer base material containing the lithium ion conductive polymer is required to have acid resistance. On the other hand, the polymer base material is required to have alkali resistance, in a case where ion exchange (i.e., ion exchange between the hydrogen ion of the sulfo group —$SO_3H$ and a lithium ion) is performed with a lithium hydroxide aqueous solution to introduce lithium ions into the lithium ion conductive polymer.

A method of filling the interspace of the polymer base material with the lithium ion conductive polymer may comprise (i) impregnating the polymer base material with a solution in which the lithium ion conductive polymer has been dissolved in an aprotic polar solvent and (ii) removing the aprotic polar solvent from the polymer base material. On the other hand, generally, since the aprotic polar solvent has high boiling point, the polymer base material impregnated with the aprotic polar solvent is required to be poorly swelled and poorly deteriorated, even when the polymer base material is heated. In other words, the polymer base material is required to have thermostability.

Since thermal crosslinking reaction in which the lithium ion conductive polymer is heated to be crosslinked proceeds at high temperature of not less than 150 degrees Celsius, the polymer base material is required to have higher thermostability. An example of the aprotic polar solvent is dimethylsulfoxide (hereinafter, referred to as "DMSO"), N, N'-dimethylformamide (hereinafter, referred to as "DMF"), N, N'-dimethylacetamide (hereinafter, referred to as "DMAC"), acetonitrile (hereinafter, referred to as "AN"), or N-methyl-2-pyrrolidone (hereinafter, referred to as "NMP").

From the above viewpoint, the polymer base material is formed of one or more kind of resin selected from the group consisting of a thermosetting resin and a thermoplastic resin which has a melting point of not less than 150 degrees Celsius. The polymer base material contains the resin as the main component thereof. Since the main component of the polymer base material is the thermosetting resin or the thermoplastic resin which has a melting point of not less than 150 degrees Celsius, the lithium ion conductive film 400 is provided with appropriate flexibility. As a result, it is easy to significantly increase an area of the lithium ion conductive film 400. In addition, the mechanical strength of the lithium ion conductive film 400 is improved to decrease the thickness of the lithium ion conductive film 400. As a result, the lithium ion conductivity is improved. Since the flow battery 1000 according to the first embodiment comprises such a lithium ion conductive film 400, the flow battery 1000 according to the first embodiment has high output.

Generally, since the thermosetting resin or the thermoplastic resin which has a melting point of not less than 150 degrees Celsius has an electrical insulation property, the resin has no bad effect (e.g., electric short) to the charge-discharge property of the flow battery.

The thermosetting resin may be aromatic polyimide synthesized by imidization of a polyamic acid precursor in view of (i) durability with regard to acid and alkali used for the formation of the lithium ion conductive film 400 and (ii) easiness of forming the lithium ion conductive film 400. The thermosetting resin may be aromatic polyimide which does not have a fluorine atom in view of (i) insolubility in the aprotic polar solvent during the formation of the lithium ion conductive film 400, (ii) resistance with regard to the redox during the operation of the flow battery, and (iii) insolubility in the first non-aqueous electrolyte liquid 110.

An example of the thermoplastic resin which has a melting point of not less than 150 degrees Celsius may be polyphenylene sulfide, a liquid crystal polymer, polysulfone, polyethersulfone, polyphenylsulfone, polyether ether ketone, or polyetherimide. Two or more kinds of these thermoplastic resins may be used in combination. The thermoplastic resin which has a melting point of not less than 150 degrees Celsius may be polyphenylene sulfide or a liquid crystal polymer in view of (i) durability with regard to acid, alkali, and the aprotic polar solvent during the formation of the lithium ion conductive film 400, (ii) insolubility in the first non-aqueous electrolyte liquid, (iii) resistance with regard to the redox during the operation of the flow battery, and (iv) easiness of forming the lithium ion conductive film 400.

An example of the shape of the polymer base material is a porous film, a non-woven fabric, or a mesh. Two or more shapes may be employed. The size and the shape of the interspace is not limited, as long as the interspace communicates with the outside thereof and holds the lithium ion conductive polymer. The interspace may be a through-hole.

As set forth above, the lithium ion conductive film 400 is poorly swelled, when in contact with the first non-aqueous electrolyte liquid 110. Also, lithium ions travels through the lithium ion conductive film 400, when the lithium ion conductive film 400 is in contact with the first non-aqueous electrolyte liquid 110. In this way, the range of choice of the first non-aqueous electrolyte liquid 110 and the first redox material 111 is expanded. Accordingly, control range of charge potential and discharge potential is expanded to raise the charge capacity.

In addition, since the lithium ion conductive film 400 has flexibility and appropriate mechanical strength, it is easy to increase an area of the lithium ion conductive film 400 and to decrease the thickness of the lithium ion conductive film 400. For this reason, the flow battery 1000 according to the first embodiment has large capacity and quick charge-discharge rate.

The thickness of the lithium ion conductive film 400 is not limited. In view of the mechanical strength and the lithium ion conductivity, the lithium ion conductive film 400 may have a thickness of not less than 1 micrometer and not more than 200 micrometers, not less than 1 micrometer and not more than 50 micrometers, or not less than 5 micrometers and not more than 30 micrometers.

(Production Method of the Lithium Ion Conductive Polymer)

Hereinafter, one example of a production method of the lithium ion conductive polymer will be described.

First, sulfonated dichlorodiphenyl sulfone represented by the following chemical formula (III), 4,4'-dichlorodiphenyl sulfone, and 4,4'-biphenol are added to an aprotic polar solvent to prepare a solution.

[Chem. 3]

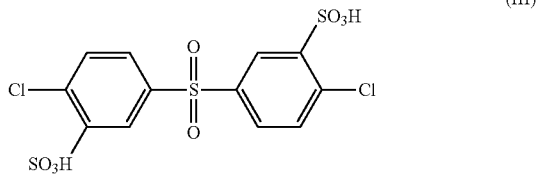

(III)

An example of the aprotic polar solvent is dimethylsulfoxide, dimethylformamide, dimethylacetamide, acetonitrile or N-methyl-2-pyrrolidone.

A molar ratio of the sulfonated dichlorodiphenyl sulfone, 4,4'-dichlorodiphenyl sulfone, and 4,4'-biphenol is not limited. The weight ratio may be 1:0.01-10:0.2-40, 1:0.1-5:0.5-20, 1:0.5-3:1.5-10, 1:1-2:2-5, or 1:1:2.

Subsequently, while the prepared solution is stirred, the prepared solution is heated to cause polymerization reaction to provide a polymer.

The polymer is purified by filtration treatment or by treatment using a dialysis membrane.

Subsequently, a sulfone group is introduced with sulfuric acid into the purified polymer. In this way, the lithium ion conductive polymer is provided.

(Production Method of the Lithium Ion Conductive Film 400)

Hereinafter, one example of a production method of the lithium ion conductive film 400 will be described.

The lithium ion conductive polymer and polyvinylidene fluoride are added to the aprotic polar solvent to prepare an application liquid.

The application liquid is applied to a substrate, and then, is dried by heating to provide a polymer membrane.

The polymer membrane is immersed in a metal compound solution to perform ion exchange treatment. In this way, the lithium ion conductive film 400 is produced.

An example of the metal compound solution used for the ion exchange treatment is a tetraglyme solution of LiTFSI.

The ion exchange group capacity of the lithium ion conductive polymer is not limited. As one example, the ion exchange group capacity may be not less than 2.5 meq/g, not less than 3.5 meq/g, or not less than 4.5 meq/g.

The first electrode 210 may be a cathode and the second electrode 220 may be an anode.

If the second electrode 220 is an electrode having relatively high electric potential, the first electrode 210 may be an anode.

In other words, the first electrode 210 may be an anode and the second electrode 220 may be a cathode.

When the first redox material 111 contained in the first non-aqueous electrolyte liquid 110 is brought into contact with the first electrode 210, the first redox material 111 is oxidized or reduced on the first electrode 210.

The first electrode 210 may have a surface on which the first redox material 111 reacts.

If the first electrode 210 has a surface on which the first redox material 111 reacts, a material stable with regard to the first non-aqueous electrolyte liquid 110 is used for the first electrode 210. The material stable with regard to the first non-aqueous electrolyte liquid 110 may be a material insoluble in the first non-aqueous electrolyte liquid 110. Furthermore, a material stable with regard to electrochemical reaction generated on the surface of the first electrode 210 may be used for the first electrode 210. An example of such a material is metal or carbon. An example of the metal is stainless steel, iron, copper, or nickel.

The first electrode 210 may have a structure which increases the surface area thereof. An example of the structure which increases the surface area is a mesh, a non-woven fabric, a surface roughened plate, or a sintered porous material. In this way, the specific surface area of the first electrode 210 is increased. As a result, oxidation reaction or reduction reaction of the first redox material 111 proceeds more easily.

The second electrode 220 may have a current collector and an active material which is provided on the current collector. An active material having a high capacity may be used.

As the active material of the second electrode 220, a compound having a property of reversibly storing and releasing lithium ions may be used.

The second electrode 220 may be a lithium metal. If the lithium metal is used as the second electrode 220, high capacity is achieved.

(Explanation of Charge-Discharge Process)

Hereinafter, one example of operation of charge-discharge process of the flow battery 1000 according to the first embodiment will be described.

The first electrode 210 is a cathode and formed of carbon black.

The first non-aqueous electrolyte liquid 110 is an ether solution in which the first redox material 111 has been dissolved.

The first redox material 111 is benzophenone (hereinafter, referred to as "BP").

The second electrode 220 is an anode and formed of a lithium metal.

(Explanation of Charge Process)

First, the charge reaction will be described.

A voltage is applied between the first electrode 210 and the second electrode 220 to charge the flow battery 1000.

(Reaction of Anode)

Due to the application of the voltage, electrons are supplied from the outside of the flow battery 1000 to the second electrode 220 which serves as the anode. As a result, reduction reaction occurs on the second electrode 220 which serves as the anode.

The following reaction occurs on the anode.

$$Li^+ + e^- \rightarrow Li$$

(Reaction of Cathode)

Due to the application of the voltage, oxidation reaction of the first redox material 111 occurs on the first electrode 210 which serves as the cathode. In other words, the first redox material 111 is oxidized on the surface of the first electrode 210. In this way, electrons are released from the first electrode 210 to the outside of the flow battery 1000.

The following reaction occurs on the cathode.

$$BP.Li \rightarrow BP + Li^+ + e^-$$

The above charge reactions may proceed until all of the first redox material 111 is oxidized or until all of the lithium ions are converted into a lithium metal.

(Explanation of Discharge Process)

Next, the discharge reaction will be described.

In the discharge reaction, electric power is taken out from the first electrode 210 and the second electrode 220.

(Reaction of Anode)

Oxidation reaction occurs on the second electrode 220 which serves as the anode. In this way, electrons are released from the second electrode 220 to the outside of the flow battery 1000.

The following reaction occurs on the anode.

$$Li \rightarrow Li^+ + e^-$$

(Reaction of Cathode)

Due to the discharge of the flow battery 1000, electrons are supplied from the outside of the flow battery 1000 to the first electrode 210 which serves as the cathode. In this way, the first redox material 111 is reduced on the surface of the first electrode 210.

The following reaction occurs on the cathode.

$$BP + Li^+ + e^- \rightarrow BP.Li$$

A part of the lithium ions are supplied from the second electrode 220 through the lithium ion conductive film 400.

The above discharge reaction may proceed until all of the first redox material 111 are reduced or until all of the lithium metal contained in the second electrode 220 are converted into lithium ions.

Second Embodiment

Hereinafter, the second embodiment of the present disclosure will be described.

The matters which have already set forth in the first embodiment will be omitted appropriately.

In the second embodiment, the first non-aqueous electrolyte liquid 110 and a second non-aqueous electrolyte liquid 120 are circulated at the sides of the first electrode 210 and the second electrode 220, respectively.

Figure 2:
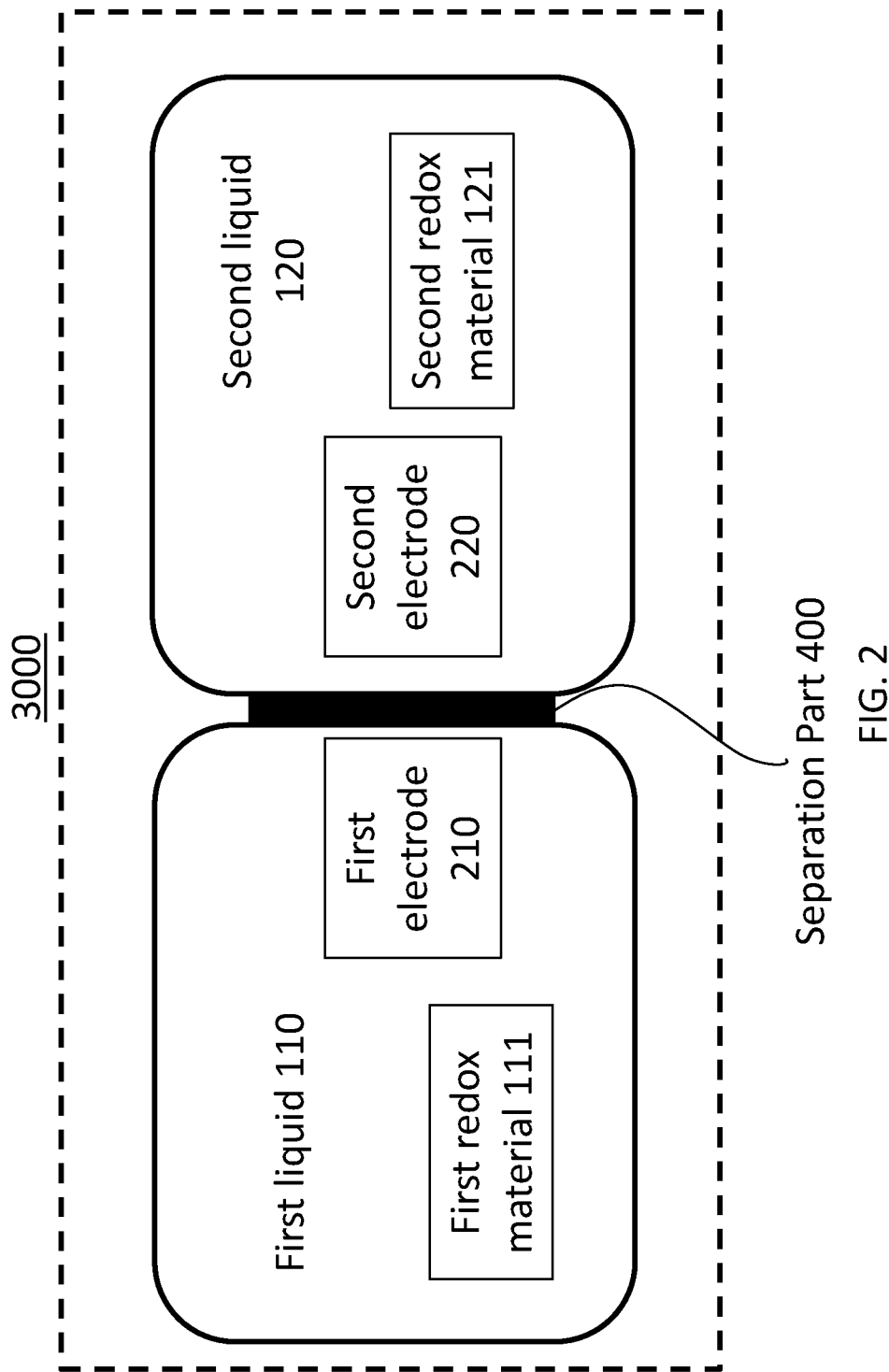
FIG. 2 shows a block diagram of a flow battery according to the second embodiment.

FIG. 2 shows a block diagram of a flow battery 3000 according to the second embodiment.

The flow battery 3000 according to the second embodiment comprises not only the elements included in the flow battery 1000 according to the first embodiment but also the following elements.

The flow battery 3000 according to the second embodiment further comprises the second non-aqueous electrolyte liquid 120, the second electrode 220, and a second redox material 121.

The second redox material 121 is dissolved in the second non-aqueous electrolyte liquid 120. The second non-aqueous electrolyte liquid 120 contains a second non-aqueous solvent.

The second electrode 220 is in contact with the second non-aqueous electrolyte liquid 120.

The lithium ion conductive film 400 separates the first electrode 210 and the second electrode 220 from each other. Likewise, the lithium ion conductive film 400 separates the first non-aqueous electrolyte liquid 110 and the second non-aqueous electrolyte liquid 120 from each other.

The flow battery 3000 according to the second embodiment has a large charge capacity and maintains charge-discharge property for a long time.

In other words, without the swelling (i.e., without the deformation) of the lithium ion conductive film 400, the lithium ions travel through the lithium ion conductive film 400 between the first non-aqueous electrolyte liquid 110 and the second non-aqueous electrolyte liquid 120, both of which are in contact with the lithium ion conductive film 400.

In this way, the range of the choice of the first non-aqueous electrolyte liquid 110, the first redox material 111 dissolved in the first non-aqueous electrolyte liquid 110, the second non-aqueous electrolyte liquid 120, and the second redox material 121 is expanded. Accordingly, the control range of the charge potential and the discharge potential is expanded to increase the charge capacity. Furthermore, even if the composition of the first non-aqueous electrolyte liquid 110 is different from the composition of the second non-aqueous electrolyte liquid 120, the charge-discharge property of the flow battery 3000 is maintained for a long time, since the first non-aqueous electrolyte liquid 110 and the second non-aqueous electrolyte liquid 120 are separated from each other with the lithium ion conductive film 400.

In the flow battery 3000 according to the second embodiment, the second non-aqueous electrolyte liquid 120 may contain a compound having either a carbonate group or an ether bond as a non-aqueous solvent, similarly to the first non-aqueous electrolyte liquid 110. The solvent of the second non-aqueous electrolyte liquid 120 is the same as or different from the solvent of the first non-aqueous electrolyte liquid 110.

In the flow battery 3000 according to the second embodiment, the second redox material 121 is dissolved in the second non-aqueous electrolyte liquid 120 and is oxidized or reduced electrochemically. In particular, the second redox material 121 may be a material listed above as the first redox material 111. A compound having a lower potential is selected as one of the first redox material 111 or the second redox material 121, and a compound having a higher potential is selected as the other. The first redox material 111 is different from the second redox material 121.

Third Embodiment

Hereinafter, the third embodiment will be described. The matters which have already set forth in the first embodiment and the second embodiment will be omitted appropriately.

Figure 3:
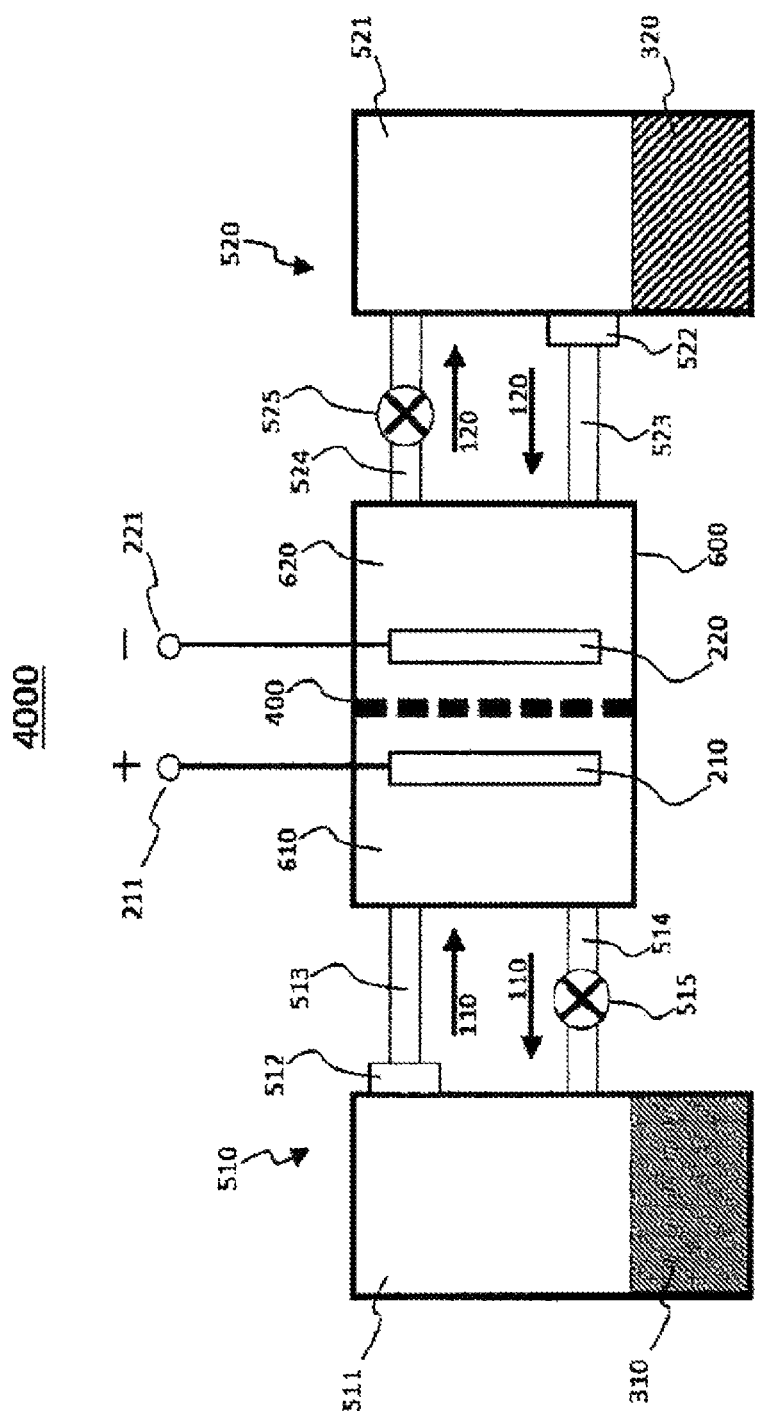
FIG. 3 shows a schematic view of a flow battery according to the third embodiment.

FIG. 3 shows a block diagram of a flow battery 4000 according to the third embodiment.

The flow battery 4000 according to the third embodiment comprises not only the elements included in the flow battery according to the second embodiment but also the following elements.

The flow battery 4000 according to the third embodiment comprises a first circulation mechanism 510.

The first circulation mechanism 510 circulates the first non-aqueous electrolyte liquid 110 between the first electrode 210 and a first active material 310.

The first circulation mechanism 510 comprises a first container 511.

The first active material 310 and the first non-aqueous electrolyte liquid 110 are contained in the first container 511.

The first active material 310 and the first non-aqueous electrolyte liquid 110 are brought into contact with each other in the first container 511. As a result, the first redox material 111 is oxidized or reduced with the first active material 310. The first redox material 111 serves as a first electrode mediator.

In the first container 511, the first non-aqueous electrolyte liquid 110 and the first active material 310 are brought into contact with each other.

An example of the first container 511 is a tank.

As shown in FIG. 3, the flow battery 4000 according to the third embodiment further may comprise an electrochemical reaction part 600, a cathode terminal 211, and an anode terminal 221.

The electrochemical reaction part 600 comprises a cathode chamber 610 and an anode chamber 620 in the inside thereof. In the electrochemical reaction part 600, the cathode chamber 610 and the anode chamber 620 are separated from each other with the lithium ion conductive film 400.

The cathode chamber 610 is provided with an electrode which serves as a cathode. In FIG. 3, the first electrode 210 is disposed in the cathode chamber 610.

The cathode terminal 211 is connected with the electrode which serves as the cathode. In FIG. 3, the cathode terminal 211 is connected with the first electrode 210.

The anode chamber 620 is provided with an electrode which serves as an anode. In FIG. 3, the second electrode 220 is disposed in the anode chamber 620.

The anode terminal 221 is connected with the electrode which serves as the anode. In FIG. 3, the anode terminal 221 is connected with second electrode 220.

The cathode terminal 211 and the anode terminal 221 may be connected with a charge device or an external load. A voltage is applied between the cathode terminal 211 and the anode terminal 221 with the charge device. When the flow battery 1000 is connected with the external load, electric power is taken out from the cathode terminal 211 and the anode terminal 221.

As shown in FIG. 3, in the flow battery 4000 according to the third embodiment, the first circulation mechanism 510 may comprise a pipe 513, a pipe 514, and a pump 515. To distinguish the pipes from each other, the pipe 513 and the pipe 514 may be referred to as a first pipe 513 and a second pipe 514, respectively.

One end of the pipe 513 is connected to an outlet of the first non-aqueous electrolyte liquid 110 of the first container 511.

The other end of the pipe 513 is connected to the cathode chamber 610.

One end of the pipe 514 is connected to the cathode chamber 610.

The other end of the pipe 514 is connected to an inlet of the first non-aqueous electrolyte liquid 110 of the first container 511.

The pipe 514 is provided with the pump 515, for example. The pipe 513 may be provided with the pump 515.

In the flow battery 4000 according to the third embodiment, the first circulation mechanism 510 may comprise a first filter 512.

The first filter 512 prevents the first active material 310 from traveling therethrough.

A flow path through which the first non-aqueous electrolyte liquid 110 flows out of the first container 511 to the first electrode 210 is provided with the first filter 512. In FIG. 3, the pipe 513 is provided with the first filter 512.

The first filter 512 prevents the first active material 310 from flowing to the outside of the first container 511 (for example, to the cathode chamber 610). In other words, the first active material 310 remains in the first container 511. In this way, the first active material 310 is not circulated. For this reason, the inside of the element(s) included in the first circulation mechanism 510 (e.g., the inside of the pipe 513) is prevented from being clogged by the first active material 310. In addition, resistance loss generated due to the flow of the first active material 310 to the cathode chamber 610 is prevented from being generated.

A joint part of the first container 511 and the pipe 513 may be provided with the first filter 512.

The first filter 512 may have a hole which is smaller than the minimum particle size of particles of the first active material 310. The first filter 512 may be formed of a material which reacts with neither the first active material 310 nor the first non-aqueous electrolyte liquid 110. An example of the material of the first filter 512 is a glass fiber filter paper, a polypropylene non-woven fabric, a polyethylene non-woven fabric, a polyethylene separator, a polypropylene separator, a polyimide separator, a two-layer structure separator of polyethylene/polypropylene, a three-layer structure separator of polypropylene/polyethylene/polypropylene, or a metal mesh which does not react with a lithium metal.

The first filter 512 prevents the first active material 310 from flowing out of the first container 511, even if not only the first non-aqueous electrolyte liquid 110 but also the first active material 310 flows in the first container 511.

In FIG. 3, the first non-aqueous electrolyte liquid 110 contained in the first container 511 is supplied to the cathode chamber 610 through the first filter 512 and the pipe 513.

The first redox material 111 which has been dissolved in the first non-aqueous electrolyte liquid 110 is oxidized or reduced on the first electrode 210.

Subsequently, the first non-aqueous electrolyte liquid 110 in which the oxidized or reduced first redox material 111 has been dissolved is supplied to the first container 511 through the pipe 514 and the pump 515.

The first redox material 111 which has been dissolved in the first non-aqueous electrolyte liquid 110 is oxidized or reduced with the first active material 310.

The circulation of the first non-aqueous electrolyte liquid 110 may be controlled with the pump 515. In other words, the supply of the first non-aqueous electrolyte liquid 110 is started or stopped appropriately with the pump 515. The supplied amount of the first non-aqueous electrolyte liquid 110 is controlled with the pump 515.

A valve may be used in place of the pump 515.

In FIG. 3, as one example, the first electrode 210 is a cathode and the second electrode 220 is an anode.

If an electrode having a relatively high electric potential is used as the second electrode 220, the first electrode 210 may be an anode.

In other words, the first electrode 210 may be an anode and the second electrode 220 may be a cathode.

The composition of the solvent of the first non-aqueous electrolyte liquid 110 may be the same as or different from the composition of the solvent of the second non-aqueous electrolyte liquid 120. On the other hand, the first redox material 111 is different from the second redox material 121.

The flow battery 4000 according to the third embodiment further comprises a second circulation mechanism 520.

The second circulation mechanism 520 circulates the second non-aqueous electrolyte liquid 120 between the second electrode 220 and a second active material 320.

The second circulation mechanism 520 comprises a second container 521.

The second active material 320 and the second non-aqueous electrolyte liquid 120 are contained in the second container 521.

The second active material 320 and the second non-aqueous electrolyte liquid 120 are brought into contact with each other in the second container 521. As a result, the second redox material 121 (i.e., second electrode mediator) is oxidized or reduced with the second active material 320. The second redox material serves as a second electrode mediator.

An example of the second container 521 is a tank.

As shown in FIG. 3, in the flow battery 4000 according to the third embodiment, the second circulation mechanism 520 may comprise a pipe 523, a pipe 524, and a pump 525. To distinguish the pipes from each other, the pipe 523 and the pipe 524 may be referred to as a third pipe 523 and a fourth pipe 524, respectively.

One end of the pipe 523 is connected to an outlet of the second non-aqueous electrolyte liquid 120 of the second container 521.

The other end of the pipe 523 is connected to the anode chamber 620.

One end of the pipe 524 is connected to the anode chamber 620.

The other end of the pipe 524 is connected to an inlet of the second non-aqueous electrolyte liquid 120 of the second container 521.

The pipe 524 is provided with the pump 525, for example. The pipe 523 may be provided with the pump 525.

In the flow battery 4000 according to the third embodiment, the second circulation mechanism 520 may comprise a second filter 522.

The second filter 522 prevents the second active material 320 from traveling therethrough.

A flow path through which the second non-aqueous electrolyte liquid 120 flows out of the second container 521 to the second electrode 220 is provided with the second filter 522. In FIG. 3, the pipe 523 is provided with the second filter 522.

The second filter 522 prevents the second active material 320 from flowing to the outside of the second container 521 (for example, to the anode chamber 620). In other words, the second active material 320 remains in the second container 521. In this way, the second active material 320 is not circulated. For this reason, the inside of the element(s) included in the second circulation mechanism 520 (e.g., the inside of the pipe 523) is prevented from being clogged by the second active material 320. In addition, resistance loss generated due to the flow of the second active material 320 to the anode chamber 620 is prevented from being generated.

A joint part of the second container 521 and the pipe 523 may be provided with the second filter 522.

The second filter 522 may have a hole which is smaller than the minimum particle size of particles of the second active material 320. The second filter 522 may be formed of a material which reacts with neither the second active material 320 nor the second non-aqueous electrolyte liquid 120. An example of the material of the filter is a glass fiber filter paper, a polypropylene non-woven fabric, a polyethylene non-woven fabric, or a metal mesh which does not react with a lithium metal.

The second filter 522 prevents the second active material 320 from flowing out of the second container 521, even if not only the second non-aqueous electrolyte liquid 120 but also the second active material 320 flows in the second container 521.

In FIG. 3, the second non-aqueous electrolyte liquid 120 contained in the second container 521 is supplied to the anode chamber 620 through the second filter 522 and the pipe 523.

The second redox material 121 which has been dissolved in the second non-aqueous electrolyte liquid 120 is oxidized or reduced on the second electrode 220.

Subsequently, the second non-aqueous electrolyte liquid 120 in which the oxidized or reduced second redox material 121 has been dissolved is supplied to the second container 521 through the pipe 524 and the pump 525.

The second redox material 121 which has been dissolved in the second non-aqueous electrolyte liquid 120 is oxidized or reduced with the second active material 320.

The circulation of the second non-aqueous electrolyte liquid 120 may be controlled with the pump 525. In other words, the supply of the second non-aqueous electrolyte liquid 120 is started or stopped appropriately with the pump 525. The supplied amount of the second non-aqueous electrolyte liquid 120 is controlled with the pump 525.

A valve may be used in place of the pump 525.

In FIG. 3, as one example, the first electrode 210 is a cathode and the second electrode 220 is an anode.

If an electrode having a relatively low electric potential is used as the first electrode 210, the second electrode 220 may be a cathode.

In other words, the second electrode 220 may be a cathode and the first electrode 210 may be an anode.

The matters set forth in the first-third embodiments may be combined appropriately with each other.

EXAMPLES

Hereinafter, the present disclosure will be described in more detail with reference to the following examples.

The sulfonated dichlorodiphenyl sulfone used in the present examples has the following chemical structure.

[Chem. 4]

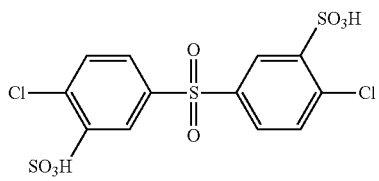

(Synthesis of Aromatic Polymer SPES 50)

The reagents listed below were added to N-methyl-2-pyrrolidone (45 milliliters, hereinafter, referred to as "NMP") to prepare an NMP solution.

Sulfonated dichlorodiphenyl sulfone (5.10 grams, 10.4 mmol)

4,4'-biphenol (1.94 grams, 10.4 mmol), and

Potassium carbonate (2.61 grams, 18.9 mmol).

The NMP solution was poured into a three-necked flask comprising a mechanical stirrer and a Dean-Stark apparatus which had a condenser on the upper part thereof. A nitrogen gas was supplied continuously through the surplus neck of the three-necked flask to the inside of the three-necked flask.

Next, while the NMP solution was stirred, the NMP solution was heated under a nitrogen atmosphere for three hours at temperature of 135 degrees Celsius to provide a mixture solution.

Toluene (15 milliliters) was added to the thus-provided mixture solution.

Next, the mixture solution was stirred at 150 degrees Celsius to perform an azeotropic treatment with the Dean-Stark apparatus. Since dehydration condensation reaction of sulfonated dichlorodiphenyl sulfone and 4,4'-biphenol with potassium carbonate is an equilibrium reaction, the dehydration condensation reaction proceeded, while the equilibrium is displaced with the azeotropic treatment. While sulfonated dichlorodiphenyl sulfone and 4,4'-biphenol were polymerized in this way, the mixture solution was heated at 185 degrees Celsius for 12 hours to provide a polymerization solution.

The provided polymerization solution was cooled to room temperature, and then, filtrated. Redundant potassium carbonate was precipitated in the polymerization solution as a solid due to the cooling. The precipitated solid potassium carbonate was removed with a filter to provide a filtrate.

Redundant sulfonated dichlorodiphenyl sulfone and 4,4'-biphenol were removed with a dialysis membrane from the provided filtrate to purify the filtrate. NMP was removed with an evaporator from the purified filtrate. In this way, an aromatic polymer SPES 50 represented by the following chemical structural formula was provided.

[Chem. 5]

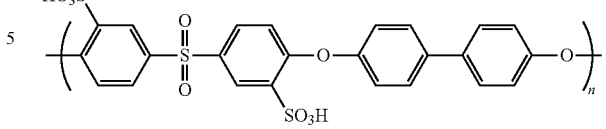

(Synthesis of Aromatic Polymer SPES 100)

The aromatic polymer SPES 50 (1.5 grams) was added to sulfuric acid (concentration: 98%, 50 milliliters) to provide a sulfuric acid solution.

While the sulfuric acid solution was stirred, the sulfuric acid solution heated for five days at 70 degrees temperature in a flask.

Next, after the sulfuric acid solution was left at rest to cool to room temperature, the sulfuric acid solution was mixed with ice-cold water. Due to the mixing, the phenyl group (namely, the phenyl group included in a part derived from the 4,4'-biphenol included in the backbone of the aromatic polymer SPES 50) reacted with sulfuric acid to substitute the hydrogen atom of the phenyl group with the sulfo group (i.e., —$SO_3H$). In this way, a reaction solution was provided.

The reaction solution was purified with a dialysis membrane, and then, water contained in the reaction solution was removed with an evaporator to provide an aromatic polymer SPES 100 represented by the following chemical structural formula.

[Chem. 6]

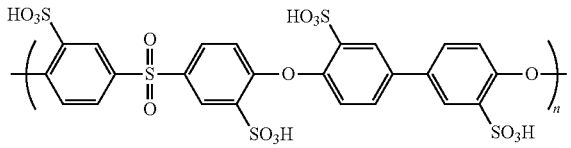

Inventive Example 1

(Production of Composite Film SP11)

The aromatic polymer SPES 100 (240 milligrams) and polyvinylidene fluoride (240 milligrams) were added to N,N'-dimethylformamide (6.4 grams) to provide a mixture liquid.

While the mixture liquid was stirred, the mixture solution was heated at 60 degrees Celsius to dissolve the aromatic polymer SPES 100 and the polyvinylidene fluoride. In this way, an application liquid containing the aromatic polymer SPES 100 and the polyvinylidene fluoride was prepared.

The present inventors observed visually that the aromatic polymer SPES 100 and the polyvinylidene fluoride were mixed with each other in the application liquid so homogeneously that a significant phase separation was not found.

The concentration of the aromatic polymer SPES 100 in the application liquid was 3.5 weight percent. The concentration of the polyvinylidene fluoride in the application liquid was also 3.5 weight percent.

Then, the application liquid was applied to a teflon petri dish. The applied application liquid was heated to dry. In this way, a polymer membrane was formed on the teflon petri dish.

A teflon sheet was pressed on the polymer membrane, and then, heated at 140 degrees Celsius for 16 hours.

Subsequently, the polymer membrane was peeled off from the teflon petri dish.

The peeled polymer membrane was immersed in a tetraglyme solution containing LiTFSI at a concentration of 1 mol/L to perform ion exchange treatment. Then, the polymer membrane was washed with triglyme. Finally, the polymer membrane was dried in a vacuum. In this way, a composite film SP11 containing the aromatic polymer SPES 100 and the polyvinylidene fluoride was provided. The composite film SP11 was light brown.

The present inventors observed visually that the composite film SP11 was a film in which the aromatic polymer SPES 100 and the polyvinylidene fluoride was mixed with each other so homogeneously that a significant phase separation was not found.

(Durability of Composite Film SP11)

The composite film SP11 was immersed in propylene carbonate for six hours. The composite film SP11 was not dissolved in the propylene carbonate. Likewise, the composite film SP11 was immersed in triglyme for six hours; however, the composite film SP11 was not dissolved in the triglyme.

An anode liquid was prepared as below.

First, in an argon box, biphenyl (92.5 milligrams) and $LiPF_6$ (911.5 milligrams) were added to a polypropylene container having a volume of 15 milliliters.

Next, in the argon box, triglyme (6 milliliters) was injected into the polypropylene container to provide a mixture liquid. The mixture liquid had a biphenyl concentration of 0.1 mol/liter and a $LiPF_6$ concentration of 1 mol/liter.

In the argon box, a lithium metal was added to the mixture liquid. The color of the mixture liquid was turned from colorless transparency into dark blue due to the dissolution of the lithium metal. The lithium metal deposited due to saturation was observed at the bottom of the mixture liquid. In this way, the anode liquid was provided.

The composite film SP11 was immersed in the anode liquid for eight hours. The composite film SP11 was not dissolved in the anode liquid. The color of the composite film SP11 was not changed.

Reference Example 1

In the reference example 1, the aromatic polymer SPES 100 was not used.

In the reference example 1, first, polyvinylidene fluoride (240 milligrams) was dissolved in N-methyl-2-pyrrolidone (2.76 grams) to provide an application liquid. The application liquid had a polyvinylidene fluoride concentration of 8 weight percent. The application liquid was applied to a glass substrate, and then dried to form a polyvinylidene fluoride membrane. After the drying, the polyvinylidene fluoride membrane was peeled off from the glass substrate. In this way, a polyvinylidene fluoride membrane was obtained. The polyvinylidene fluoride membrane was light brown and translucent.

The polyvinylidene fluoride membrane was immersed in the anode liquid for eight hours; however, the polyvinylidene fluoride membrane was not dissolved in the anode liquid. The shape and color of the polyvinylidene fluoride membrane was not changed.

The reference example 1 means that the polyvinylidene fluoride membrane has durability against the anode liquid. In the reference example 1, note that the polyvinylidene fluoride membrane did not have lithium ion conductivity.

Comparative Example 1

In the comparative example 1, polyvinylidene fluoride was not used. In the comparative example 1, the aromatic polymer SPES 100 (240 milligrams) was dissolved in N, N'-dimethylformamide (6.6 grams) to provide an application liquid. The application liquid had a SPES 100 concentration of 3.5 weight percent. The application liquid was applied on a glass substrate, and then, dried to form an aromatic polymer SPES 100 film. After the drying, the aromatic polymer SPES 100 film was peeled from the glass substrate. In this way, a polyvinylidene fluoride membrane was provided. The aromatic polymer SPES 100 film was light brown and translucent.

In the comparative example 1, first, the aromatic polymer SPES100 film was immersed in propylene carbonate for six hours. As a result, the aromatic polymer SPES100 film was completely dissolved in the propylene carbonate.

Aside from this, the aromatic polymer SPES100 film was immersed in triglyme for six hours. As a result, the aromatic polymer SPES100 film was swelled (namely, deformed). As just described, since the aromatic polymer SPES100 film was swelled (namely, deformed), it was expected that the redox materials such as biphenyl were mixed between the cathode chamber 610 and the anode chamber 620 with each other. For this reason, if polyvinylidene fluoride was not used, it was clear that the aromatic polymer SPES100 film was not allowed to be used as a lithium ion conductive film and that, as a result, a flow battery comprising the aromatic polymer SPES100 film failed to operate.

Comparative Example 2

In the comparative example 2, an experiment similar to the inventive example 1 was conducted, except that polytetrafluoroethylene was used in place of the polyvinylidene fluoride. In the comparative example 2, a composite film SPtfe11 containing the aromatic polymer SPES 100 and the polytetrafluoroethylene (purchased from Daikin industries, Ltd., trade name: polyflon PTFE F-104) was provided in place of the composite film SP11. The powder of the polytetrafluoroethylene used as a starting material had an average particle size of 550 micrometers.

The composite film SPtfe11 was immersed in propylene carbonate for six hours. As a result, the aromatic polymer SPES 100 contained in the composite film SPtfe111 was dissolved in the propylene carbonate.

Likewise, the composite film SPtfe11 was immersed in triglyme for six hours. As a result, the composite film SPtfe11 was swelled (namely, deformed).

The composite film SPtfe11 was immersed in the anode liquid for eight hours. As a result, the aromatic polymer SPES 100 contained in the composite film SPtfe11 was swelled (namely, deformed). Furthermore, the color of a part of the composite film SPtfe111 was turned into black. The reason why the color was turned into black would be that the polytetrafluoroethylene was reduced and carbonized due to the strong reduction ability of the anode liquid.

Comparative Example 3

A polytetrafluoroethylene film (purchased from AS ONE Corporation, trade name: PTFE Sheet) was immersed in the anode liquid for eight hours. The polytetrafluoroethylene film was not dissolved in the anode liquid. The shape of the polytetrafluoroethylene film was maintained. However, the color of the polytetrafluoroethylene film was turned into black. As above described, the reason why the color was turned into black would be that the polytetrafluoroethylene was reduced and carbonized due to the strong reduction ability of the anode liquid.

Polytetrafluoroethylene powder (purchased from Daikin industries, Ltd., trade name: polyflon PTFE F-104, 300 milligrams) was immersed in the anode liquid (1 milliliter). Immediately after the immersion, the color of the polytetrafluoroethylene powder was turned into black. The color of the anode liquid was turned from dark blue to yellow transparency.

As is clear of the comparison of the reference example 1 to the comparative example 3, polyvinylidene fluoride has higher durability against the anode liquid than polytetrafluoroethylene.

As is clear of the comparison of the inventive example 1 to the comparative examples 1 and 2, since the composite body comprised in the lithium ion conductive film contains polyvinylidene fluoride, the composite body has higher durability against the first non-aqueous electrolyte liquid containing the lithium ions and the redox material.

INDUSTRIAL APPLICABILITY

The flow battery according to the present disclosure can be used suitably for an electric storage device and an electric storage system.

REFERENTIAL SIGNS LIST

110 First non-aqueous electrolyte liquid
111 First redox material
120 Second non-aqueous electrolyte liquid
121 Second redox material
210 First electrode
211 Cathode terminal
220 Second electrode
221 Anode terminal
310 First active material
320 Second active material
400 Lithium ion conductive film
510 First circulation mechanism
511 First container
512 First filter
513, 514, 523, 524 Pipe
515, 525 Pump
520 Second circulation mechanism
521 Second container
522 Second filter
600 Electrochemical reaction part
610 Cathode chamber
620 Anode chamber
1000, 3000, 4000 Flow battery

The invention claimed is:

1. A flow battery, comprising:
a first non-aqueous electrolyte liquid;
a first electrode in contact with the first non-aqueous electrolyte liquid;
a second electrode which serves as a counter electrode of the first electrode; and
a lithium ion conductive film which separates the first electrode and the second electrode from each other, wherein:
the first non-aqueous electrolyte liquid contains:
lithium ions; and
at least one kind of first redox material selected from the group consisting of biphenyl, phenanthrene, stilbene, triphenylene, anthracene, acenaphthene, acenaphthylene, fluorene, fluoranthene, o-terphenyl, m-terphenyl, and p-terphenyl,
the lithium ion conductive film comprises a composite body,
the composite body contains a lithium ion conductive polymer and polyvinylidene fluoride,
the lithium ion conductive polymer includes an aromatic ring into which a lithium salt of an acidic group has been introduced,
the lithium ion conductive polymer and the polyvinylidene fluoride have been mixed with each other homogeneously in the composite body, and
the lithium ion conductive polymer is represented by the following chemical formula:

[Chem. 1]

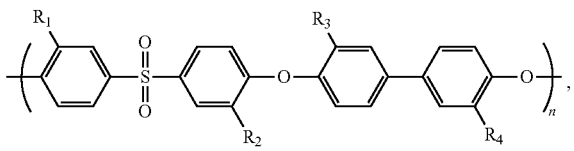

where
n is a natural number,
$R_1$, $R_2$, $R_3$, and $R_4$ are, each independently, selected from the group consisting of —$SO_3Li$ group and a hydrogen atom, and
at least one group selected from the group consisting of $R_1$, $R_2$, $R_3$, and $R_4$ is the —$SO_3Li$ group.

2. The flow battery according to claim 1, wherein the first redox material is biphenyl.

3. The flow battery according to claim 1, wherein a weight ratio of the lithium ion conductive polymer to the polyvinylidene fluoride is not less than 3/7 and not more than 8/2.

4. The flow battery according to claim 3, wherein a weight ratio of the lithium ion conductive polymer to the polyvinylidene fluoride is not more than 50/50.

5. The flow battery according to claim 1, wherein:
the lithium ion conductive film further contains a polymer base material,
the polymer base material has an interspace which communicates with an outside thereof,
the polymer base material is formed of at least one kind of resin selected from the group consisting of a thermosetting resin and a thermoplastic resin which has a melting point of not less than 150 degrees Celsius, and
the composite body is contained in an inside of the interspace of the polymer base material.

6. The flow battery according to claim 5, wherein the thermoplastic resin which has a melting point of not less than 150 degrees Celsius is at least one selected from the group consisting of polyphenylene sulfide and a liquid crystal polymer.

7. The flow battery according to claim 5, wherein the thermosetting resin is aromatic polyimide which does not have a fluorine atom.

8. The flow battery according to claim 5, wherein the polymer base material is at least one kind of a base material selected from the group consisting of a porous film, a non-woven fabric, and a mesh.

9. The flow battery according to claim 1, wherein the first non-aqueous electrolyte liquid contains, as a solvent, a compound having at least one selected from the group consisting of a carbonate group and an ether bond.

10. The flow battery according to claim 1, wherein the first non-aqueous electrolyte liquid contains, as a solvent, at least one selected from the group consisting of propylene carbonate, ethylene carbonate, dimethyl carbonate, ethyl methyl carbonate, and diethyl carbonate.

11. The flow battery according to claim 1, wherein the first non-aqueous electrolyte liquid contains, as a solvent, at least one selected from the group consisting of dimethoxyethane, dibutoxyethane, diglyme, triglyme, tetraglyme, tetrahydrofuran, 2-methyltetrahydrofuran, 2,5-dimethyltetrahydrofuran, 1,3-dioxolane, and 4-methyl-1,3-dioxolane.

12. The flow battery according to claim 1, further comprising:
a first active material; and
a first circulation mechanism for circulating the first non-aqueous electrolyte liquid between the first electrode and the first active material, wherein:
the first active material is insoluble in the first non-aqueous electrolyte liquid,
the at least one kind of first redox material is oxidized or reduced on the first electrode, and
the at least one kind of first redox material is oxidized or reduced with the first active material.

13. The flow battery according to claim 12, further comprising:
a second non-aqueous electrolyte liquid;
a second redox material;
a second active material; and
a second circulation mechanism for circulating the second non-aqueous electrolyte liquid between the second electrode and the second active material, wherein:
the second non-aqueous electrolyte liquid contains the second redox material,
the second active material is insoluble in the second non-aqueous electrolyte liquid,
the second electrode is in contact with the second non-aqueous electrolyte liquid,
the second redox material is oxidized or reduced on the second electrode, and
the second redox material is oxidized or reduced with the second active material.

14. The flow battery according to claim 1, wherein the least one kind of first redox material is selected from the group consisting of phenanthrene, stilbene, triphenylene, acenaphthene, acenaphthylene, fluorene, fluoranthene, o-terphenyl, m-terphenyl, and p-terphenyl.

15. The flow battery according to claim 1, wherein $R_1$, $R_2$, $R_3$, and $R_4$ satisfy one of:
(i) one of $R_1$, $R_2$, $R_3$, and $R_4$ is —$SO_3Li$ group and remaining three of $R_1$, $R_2$, $R_3$, and $R_4$ are each a hydrogen atom,
(ii) three of $R_1$, $R_2$, $R_3$, and $R_4$ are each independently —$SO_3Li$ group and a remaining one of $R_1$, $R_2$, $R_3$, and $R_4$ is hydrogen atom, or
(iii) $R_1$, $R_2$, $R_3$, and $R_4$ are each independently —$SO_3Li$ group.

* * * * *